(No Model.) 4 Sheets—Sheet 1.
D. A. A. BUCK.
PHOTOGRAPHIC CAMERA.
No. 357,114. Patented Feb. 1, 1887.
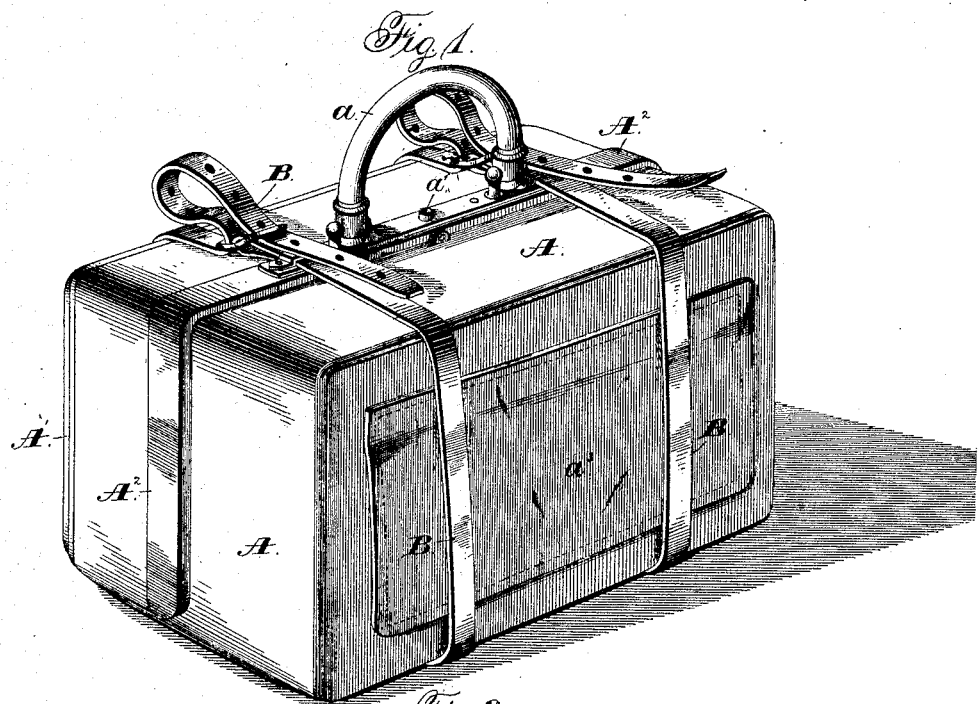
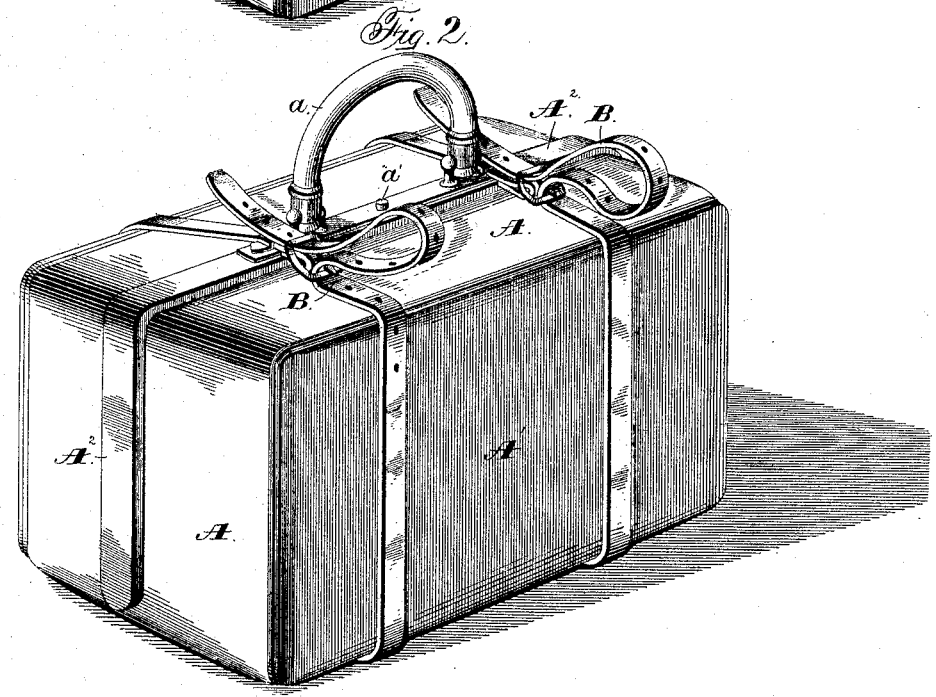

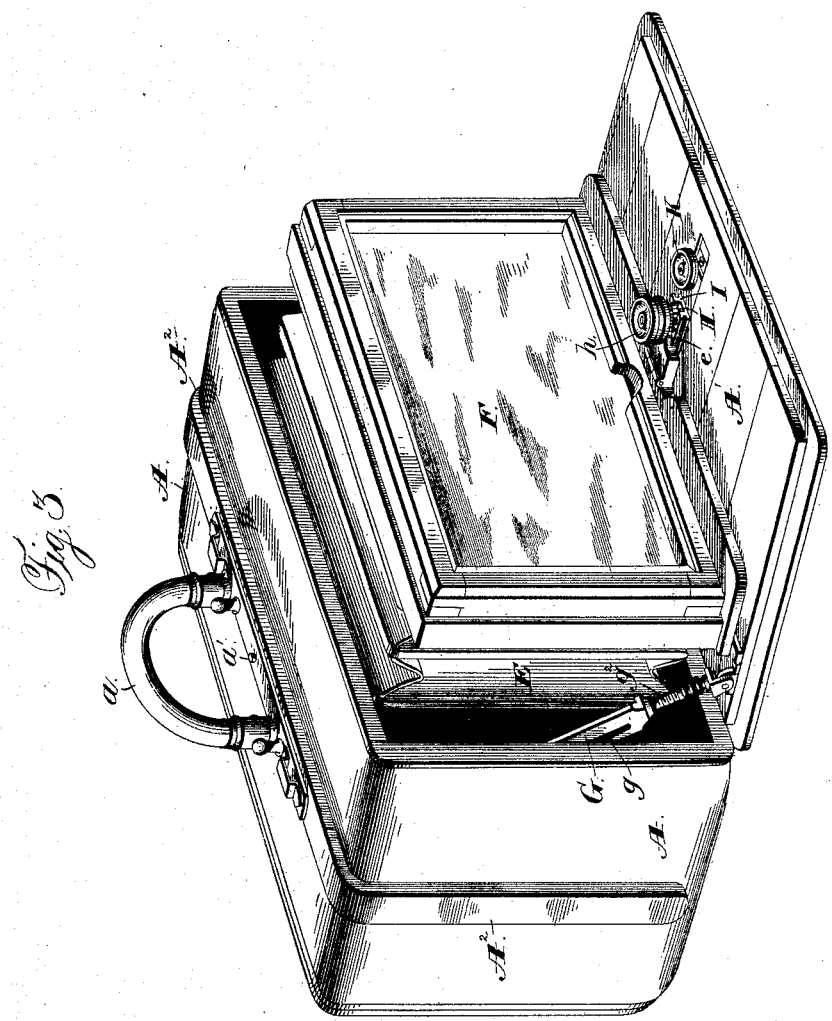

(No Model.) 4 Sheets—Sheet 3.
D. A. A. BUCK.
PHOTOGRAPHIC CAMERA.
No. 357,114. Patented Feb. 1, 1887.
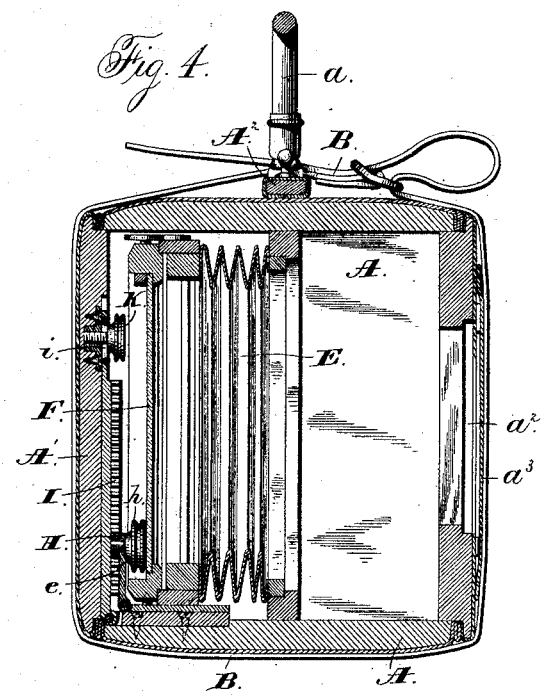
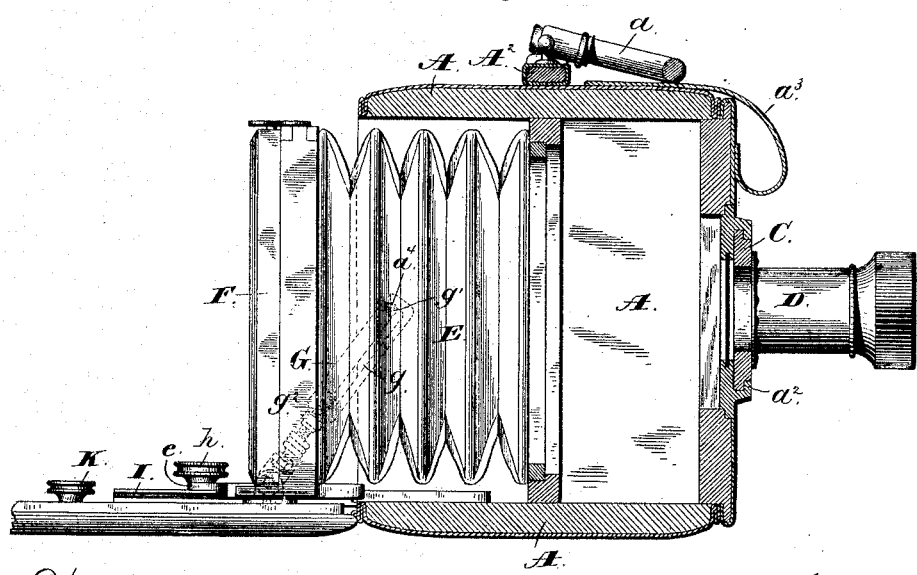
Witnesses:
Jas. E. Hutchinson.
Henry C. Hazard.
Inventor:
D. A. A. Buck, by
Prindle and Russell, his Attys.

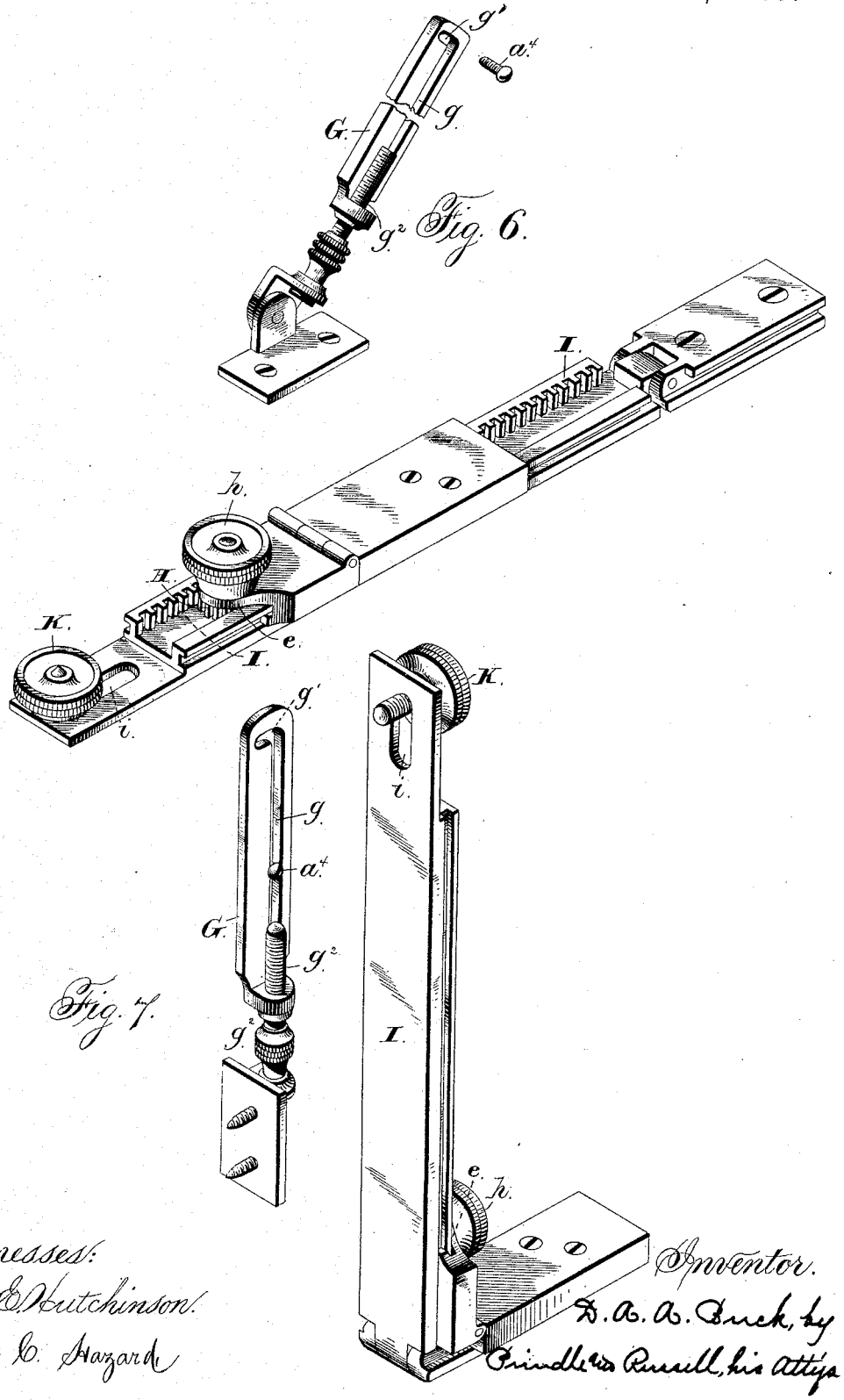

UNITED STATES PATENT OFFICE.

DANIEL A. A. BUCK, OF CHESHIRE, CONNECTICUT.

PHOTOGRAPHIC CAMERA.

SPECIFICATION forming part of Letters Patent No. 357,114, dated February 1, 1887.

Application filed August 28, 1886. Serial No. 212,098. (No model.)

*To all whom it may concern:*

Be it known that I, DANIEL A. A. BUCK, of Cheshire, in the county of New Haven, and in the State of Connecticut, have invented certain new and useful Improvements in Photographic Cameras; and I do hereby declare that the following is a full, clear, and exact description thereof, reference being had to the accompanying drawings, in which—

Figure 1 is a perspective view, from the front side, of my camera closed for transportation. Fig. 2 is a like view of the same from the rear. Fig. 3 is a perspective view of said camera from the rear as arranged for use. Figs. 4 and 5 are vertical central sections of the same and show, respectively, the arrangement of parts when closed together for transportation and when arranged for use; and Figs. 6 and 7 are enlarged perspective views of the locking-brace, the adjusting-rack, and their connecting parts, and show, respectively, their position when the camera is in use and when the camera is closed.

Letters of like name and kind refer to like parts in each of the figures.

The object of my invention is to furnish, in a simple, neat, and compact form, a portable photographic apparatus; and to this end said invention consists, principally, in a casing for a camera constructed in the manner and for the purpose substantially as is hereinafter specified.

It consists, further, in the means employed for adjusting the glass and plate holder toward or from the lens, substantially as and for the purpose hereinafter shown and described.

It consists, finally, in a portable camera in which the posts are constructed and combined to operate in the manner and for the purpose hereinafter specified.

In the carrying of my invention into practice I employ a box, A, which is constructed from wood or other suitable material, has a general rectangular shape, and has one of the sides inclosed by means of a door, A', that is hinged at its lower edge to the contiguous portion of said box. The exteriors of said box and door are covered by leather or other like material, and along its upper side and ends, midway between said door and its opposite side, is secured a leather-covered strip, $A^2$, (which serves for the attachment of a handle, $a$,) an imitation lock, $a'$, and straps B and B, that pass around said box and door, the result being the production of an article which exteriorly has the appearance of a hand-satchel of usual form and construction, as seen in Figs. 1 and 2.

Within the front side of the box A is provided a rectangular opening, $a^2$, that has its outer edge rabbeted and adapted to receive a lens-slide, C, of usual construction, which slide is detachable and held in place by turn-buttons, or any desired usual means, and is provided with a lens, D, that is also detachable. When said lens is removed said slide is covered by means of a leather flap, $a^3$, which is secured at its upper edge to said box, and resembles the flap that is usually attached to one side of a hand-satchel for the purpose of covering an outside pocket.

Interiorly the box A has such size and shape as to adapt it to the desired size of plates to be employed, and within such interior is placed a bellows, E, that at its inner end is secured to the front side of said box, and at its rear end is adapted to receive a focusing-glass, F, or the holder for a sensitized plate. Said bellows is adapted to be extended rearward in the usual manner, and when thus extended rests upon and is supported by the door A', which is turned downward to the position shown in Figs. 3 and 5.

In order that the door A' may be locked in place when turned downward, there is provided a brace, G, which, as seen in Figs. 6 and 7, has one end pivoted upon the upper face at one end of said door, and its opposite end engaged with a stud, $a^4$, that projects outward from the inner face of one of the ends of the box A.

In order that the door A' may be readily opened or closed, the brace G is provided with a slot, $g$, which extends from near its inner end to or beyond its longitudinal center, and enables it to slide over the stud $a^4$ as said door is moved upon its hinges. At the inner end of said slot is provided a notch, $g'$, that is adapted to engage said stud when said brace, by the opening of said door, has been drawn downward to the lower limit of its motion.

For the purpose of adjusting the focusing-glass F to the desired angle with reference to the lens D, the lower half of the brace G is composed in part of a screw, $g^2$, which has one end swiveled and the opposite threaded end contained within a correspondingly-threaded opening, the arrangement being such that by turning said screw with the fingers said brace will be shortened, so as to raise the door A′, or lengthened, so as to lower said door, the exact adjustment required being easily obtained.

The adjustment of the focusing-glass F toward or from the lens D is effected by means of a pinion, H, which is journaled within a lug, $e$, that extends rearward from the lower central portion of the rear end of the bellows E, and a toothed rack, I, which is secured upon the inner face of the door A′ and is engaged by said pinion. A milled head, $h$, upon the upper end of the shaft of said pinion enables the latter to be rotated, so as to move the rear end of said bellows in the desired direction.

In order that the free movements of the door A′ may not be interfered with by the rack-and-pinion adjustment for the bellows, the pivotal lug $e$ and rack I are jointed at the points where they are respectively attached to the bellows E and box A, so as to enable each, when said bellows is closed inward to fold upward with said door, while the outer end of said rack is provided with a longitudinal slot, $i$, which receives the screw K that confines said end in place, the arrangement being such as to permit said rack to have a slight longitudinal movement with relation to said door as the latter turns upon its hinges, such movement being necessary in consequence of the different planes occupied by the hinges of said door and the joint of said rack.

It will be seen that when arranged for use the apparatus is complete and has every adjustment necessary. When not required for use the bellows are moved to the inner limit of motion, the lens is detached, and with the focusing-cloth and two or more plate-holders may be placed within said bellows, after which the upper end of the locking-brace is released, the door closed upward to place, and the whole then strapped together, when said apparatus will present the appearance of an ordinary satchel, and may be as easily carried by the operator.

Having thus described my invention, what I claim is—

1. As an improvement in portable photographic apparatus, a leather-covered camera-box having the external shape of a hand-satchel provided with a handle and straps, and having within one side a lens-holder and having its opposite side formed by a hinged leather-covered door, in combination with a lens, a bellows, and means for holding a detachable focusing-glass or sensitized plate, substantially as and for the purpose specified.

2. In combination with the camera-box, the hinged door or bellows-support, and the extensible bellows, a toothed rack which at its outer end is secured upon said door and at its inner end is hinged to said box, and a pinion that is journaled within a lug which is hinged to the rear end of said bellows, substantially as and for the purpose shown and described.

3. As an improvement in portable photographic apparatus, a camera-box having the external shape and appearance of a hand-satchel and provided with a flap-covered lens-holder and a hinged rear side, a bellows contained within said box and adapted at its rear end to receive a focusing-glass or sensitized plate, means, substantially as shown, for locking in position and varying the inclination of said hinged side, and means, substantially as shown, for adjusting the rear end of said bellows toward or from said lens-holder, in combination with each other and with a lens, substantially as and for the purpose specified.

In testimony that I claim the foregoing I have hereunto set my hand this 12th day of March, A. D. 1886.

DANIEL A. A. BUCK.

Witnesses:
EDWARD B. HUME,
HALSEY W. KELLEY.